Feb. 16, 1926.

Re. 16,266

F. D. WILSON ET AL

TRANSMISSION DEVICE

Original Filed Jan. 2, 1923 2 Sheets-Sheet 1

INVENTORS
Frederick D. Wilson
Leonard S. Burns

By

ATTORNEY

Feb. 16, 1926. Re. 16,266

F. D. WILSON ET AL

TRANSMISSION DEVICE

Original Filed Jan. 2, 1923 2 Sheets-Sheet 2

INVENTORS
Frederick D. Wilson
Leonard S. Burns

BY

ATTORNEY

Reissued Feb. 16, 1926. Re. 16,266

UNITED STATES PATENT OFFICE.

FREDERICK D. WILSON AND LEONARD S. BURNS, OF HARVEY, ILLINOIS, ASSIGNOR, BY MESNE ASSIGNMENTS, TO WILSON TRACTOR MANUFACTURING COMPANY, OF OTTUMWA, IOWA, A CORPORATION OF IOWA.

TRANSMISSION DEVICE.

Original application filed January 2, 1923, Serial No. 610,131. Renewed October 27, 1924. Original No. 1,533,626, dated April 14, 1925. Application for reissue filed October 19, 1925. Serial No. 63,542.

*To all whom it may concern:*

Be it known that we, FREDERICK D. WILSON and LEONARD S. BURNS, citizens of the United States, residing at Harvey, in the county of Cook and State of Illinois, have invented certain new and useful Improvements in Transmission Devices, of which the following is a specification.

Our invention has reference to transmissions devices, and pertains more especially to such devices, as are designed for use in connection with tractor driving mechanism, such as has been shown and set forth in Letters Patent No. 1,439,045, issued December 19, 1922, to said Frederick D. Wilson. One of the purposes of said mechanism is to secure the joint operation of two sets of devices, such as the tread wheels on opposite sides of a tractor, and at the same time provide means for continuing the operation of one of said sets of devices, while interrupting the movement of the other one. This was accomplished in said former invention by means of worm-drive gearing, the pitch of the spirals on the worm-shaft being such as to cause an automatic stoppage of the parts associated therewith, upon said shafts being deprived of power. It has been found in practice, however, that there is a tendency of such worm-shafts to continue their movement for a time, caused partly by the momentum of the parts, and partly by the fluid friction induced by the oil in the casing in which such parts are enclosed. This continued movement is detrimental to the prompt action of the mechanism, such as changing the direction of a tractor at a desired point, but has a tendency to carry the machine past such point.

The chief purpose of the present invention is to provide means for instantly interrupting the movement of such worm-shafts, as soon as the power is removed therefrom. This is accomplished by means of clutch devices, which act as a brake on the worm-drive mechanism, as soon as the same has been released by the clutch members by means of which the worm-shaft is set in motion. This arrangement of clutch devices is under the same control as that of which the drive clutches are set, and is arranged so as to operate upon the reverse action of the mechanism for controlling the drive clutches.

The above named, and other features and advantages of the invention, will more fully appear, from the following specification, reference being had to the accompanying drawings, in which:—

Figure 1:
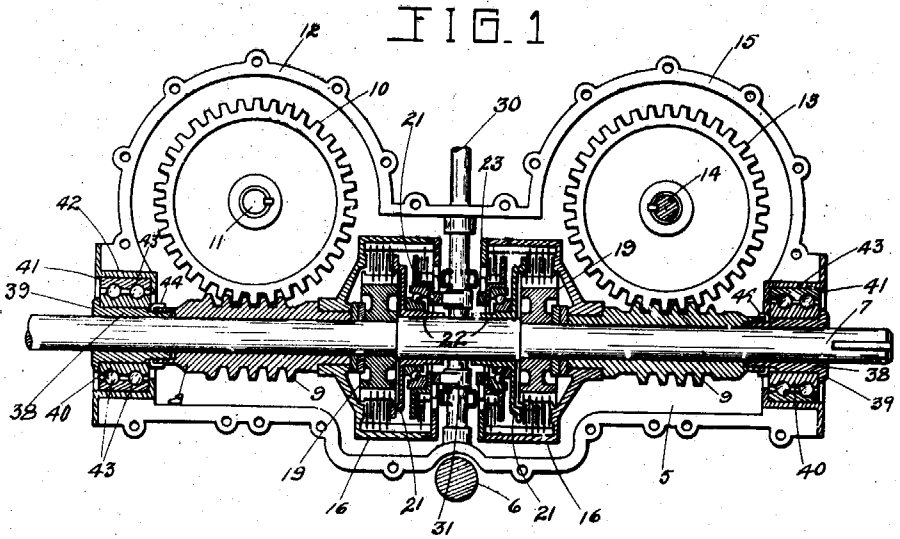
Fig. 1 shows the main part of the invention, in vertical longitudinal section.
Figure 5:
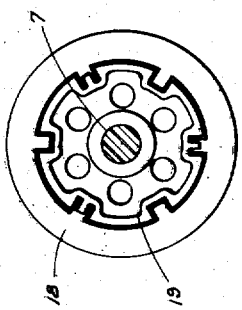
Fig. 5 is an end view of the wheel 19.
Figure 4:
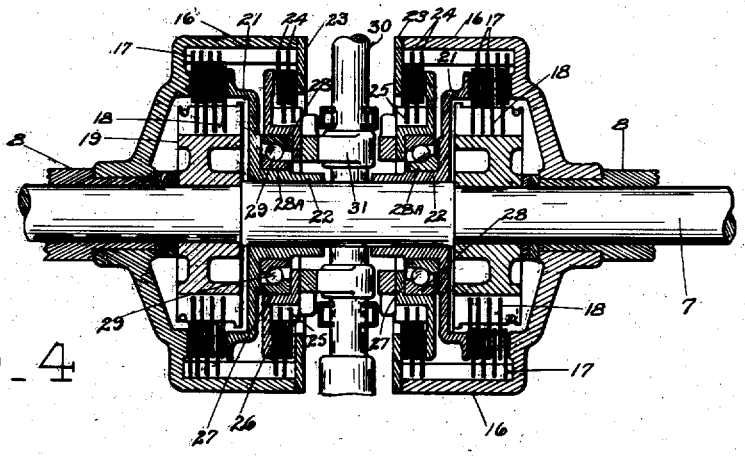
Fig. 4 is an enlargement of the central part of Fig. 1.
Figure 2:
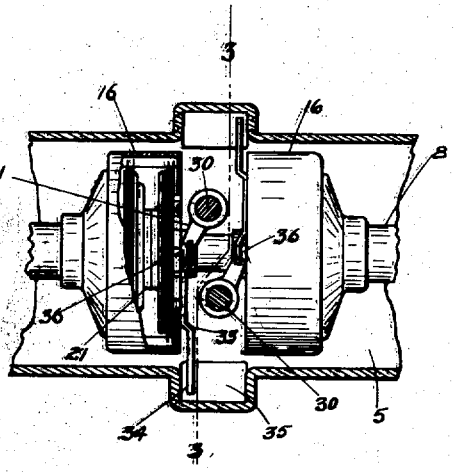
Fig. 2 is a plan view of the clutch mechanism, with one of the clutch members broken away.
Figure 3:
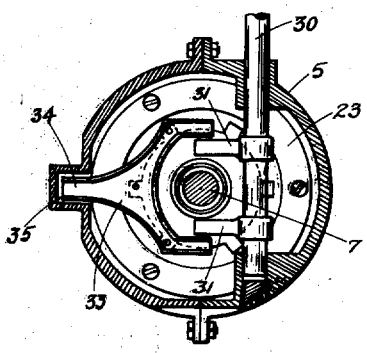
Fig. 3 is a vertical cross-section on the broken line 3—3 of Fig. 2.

The mechanism is shown enclosed in a casing, 5, transversely of which is the rear axle, 6, of the tractor with which the invention is embodied. Extending longitudinally of the casing, 5, is a shaft, 7, rotatably mounted, and fitted at one of its ends for connection with the main drive shaft of the tractor motor, so as to be operated thereby. Mounted on the shaft, 7, near the ends thereof, so as to be rotatable thereon are sleeves, 8, provided on their outer faces with worm-spirals, 9, one of which is engageable with a worm-gear wheel, 10, fixed on a shaft, 11, which is journaled in a casing, 12, forming an extension of the casing, 5. The other sleeve, 8, is similarly provided with a worm drive for engagement with a worm-gear wheel, 13, on a shaft, 14, journaled in a casing, 15, also forming an extension of the casing, 5. This part of the mechanism is substantially the same as that which is set forth in said former application, the purpose being to transmit power from the shaft, 7, through the shafts, 11 and 14, in opposite directions, to drive the tread wheels on opposite sides of the tractor, or for similar uses.

The movement of the shaft, 7, is imparted to the worm-shafts, 8, by similar groups of mechanism, and in the following description thereof only one of said groups will be referred to, the various parts being provided with corresponding reference numbers in the drawings. Fixed to the inner end of the sleeve, 8, is a clutch-member, 16, held in which is a series of friction discs, 17, adapted for engagement with a similar series of discs, 18, carried on the rim of a wheel, 19, fixed on the shaft, 7. A clutch-member, 21, is supported on a sleeve, 22, loosely mounted on the shaft, 7. The last-named clutch-member is adapted to actuate the discs, so as to compress the same and lock the wheel, 19, and member, 16, together, causing a rotary movement of said wheel and the sleeve, 8.

The clutch member, 16, is provided at its edge with an annular flange, 23, within which are supported friction discs, 24, for engagement with similar discs, 25, carried by a clutch member, 26. Between the clutch members, 21 and 26, is a circular space rectangular in cross-section, containing rings, 28 and 28ª, grooved in their adjacent faces to form a ball race for a plurality of balls, 29, which permit rotary but not longitudinal freedom of movement of one of said parts, 21 and 26, with relation to the other. Supported vertically in the casing, 5, is an operator's rod, 30, to which is fixed a pair of arms, 31, the ends of which have a bearing against the collar, 27, on opposite sides of the shaft, 7. The application of force to said arms operates to crowd the members, 21 and 26, outwardly, resulting in the engagement of the discs, 17 and 18, as before mentioned.

The clutch member, 26, is held from rotation by means of forked arm, 33, secured to the collar, 27, and provided with an extension, 34, having lateral play in a boxing, 35, projected outwardly from the casing, 5. The inner ends of the forks of the arm, 33, are bent outwardly, for engagement with lugs, 36, on the ends of the arms, 31. After the discs, 17 and 18, have been engaged, in order to release the same, the rod, 30, is operated to move the arms, 31, toward a central position, a continued movement thereof, bringing the discs, 25, into contact with the discs, 24, which acts as a drag upon the member 16, causing the same to at once cease from rotating.

Each of the clutch mechanisms is provided with one of the operator's rods, and when both of said rods are actuated at the same time the shafts, 11 and 14, are simultaneously driven. Upon the force of either of the rods, 30, being withdrawn the shaft controlled by the other rod continues to rotate, while the release of the pressure of the first rod not only disengages the operating clutch, but throws the brake clutch into action, causing an instant stoppage of the worm-drive, which is controlled thereby. The release of the pressure of the other rod, 30, operates in the same way with the devices under the control thereof. In case it is desired to stop the mechanism quickly, this can be done by operating both of the rods at the same time, to free the active clutches and apply the brake clutches. The application of the invention to the operation of a tractor, in the manner set forth in said former application, will be obvious. A proper manipulation of the controlling rods will cause the machine to turn abruptly to one side or other of a direct line, as desired.

Each of the worm-sleeves, 8, is provided at its outer end with a special form of bearing, comprising a tubular member, 38, rotatable on the shaft, 7, and connected with the worm sleeve by means of a portion extending into a recess in the end of the sleeve, the connection between said parts being preferably of a threaded character. On the outer end of the member, 38, is an annular flange, 39, within which is held a ball-bearing member, 40, encircled by a complementary member, 41, which is held in a boxing, 42, in the end of the casing, 5. The adjacent faces of the parts, 40 and 41, are grooved to form races for series of balls, 43. By means of the threaded connection between the parts, 8 and 38, a longitudinal adjustment of the extension may be secured. After the position of such extension has been established, it may be locked from displacement by means of a collar, 44, slidable on the reduced portion of the extension, and rotatable therewith. A portion of the collar is bent at opposite edges thereof, so as to engage flattened end portions of the member, 8. The collar, 44, also bears against the inner end of the bearing, 40, and prevents outward movement of the extension, 38, and worm-gear member, 8.

It will be evident that this is a very simple arrangement for supporting the outer ends of the worm-gears, and one wherein each of the worm devices is independent of the other, so that the end-thrust to which these devices are subject, when in action, will not be imparted from one thereof to the other. It is also obvious that this end-thrust is fully taken care of in the style of support for the worm-sleeve hereinabove set forth. In the mechanism shown, when both of the worm devices would be in operation, either forwardly or reverse, the line of thrust would be in the same direction, and the end-thrust in either direction is fully overcome by the bearings in the ends of the casing, 5.

Another advantage of the worm-gear drive above mentioned is found in the comparatively short worm-body, with a correspondingly reduced length of opening to be drilled therein, greatly facilitating the manufacture thereof.

What we claim, and desire to secure by Letters Patent, is:

1. In a device of the class described comprising a driving element, and an element driven thereby; gear mechanism operatively connected to said driven element; a plurality of friction clutch-driving discs adapted to co-operate to impart the movement of the driving element to said gear mechanism; a plurality of friction clutch discs capable of a brake action on said gear mechanism; manually operable means adjacent the driving discs for actuating them; and non-rotatable means between the driving and brake discs operatively connected with and movable toward the said manually operable means for actuating the brake discs when the driving discs are released.

2. The combination of two friction disc clutches, one adapted to rotate and the other to stop a propelling mechanism for a vehicle and operatively connected for alternate actuation; a vertically disposed, manually operable member, movable between two positions, adapted to actuate said clutches, a non-rotatable member between said clutches, movable toward and away from the driving clutch; arms fixed to said manually operable member and operatively connected to the non-rotatable member to move the non-rotatable member toward said operable member to set the brake clutch and release the drive clutch, or the reverse, as desired.

3. The combination of a worm gear driving mechanism for a vehicle and two multiple disc clutch mechanisms, one adapted to rotate and the other to stop the worm-gear mechanism; a driving shaft, adapted to drive said worm gear mechanism through one of said clutches; a driven shaft operatively connected to the driving shaft and both clutches, the axis of said driven shaft being at right angles to and above, the axis of the last named shaft; a manually operable member for actuating said clutches; a non-rotatable member, a portion of which is between the clutch mechanisms, operatively connected to, movable with and toward said manually operable member to set one of said clutches or the reverse, as desired.

4. In a device of the class described, in combination with a driving shaft and a shaft to be driven thereby, a gear mechanism adapted to impart the movement of the driving shaft to the last-named shaft; a drive clutch mechanism including a plurality of friction discs; a brake clutch mechanism including a plurality of friction discs; an operative member rotatable with the first-named clutch mechanism, and capable of causing the engagement of the discs thereof; an operative member having a non-rotatable relation with a portion of the brake mechanism and adapted to cause the engagement of the discs thereof; means for holding said last-named operating member from rotation; and means for imparting movement to both clutch operating members to cause simultaneous action thereof, to set the drive clutch discs and release the brake clutch discs or the reverse, as desired.

5. In a device of the class described, in combination with an elongated, oil-tight, casing and a driven shaft therein, a shaft above and at right angles to the driven shaft, worm-gear mechanism adapted to impart the movement of the first-named shaft to the last-named shaft, the worm member of said mechanism being in the lower part of the casing and below the gear member; a driving clutch in said casing, operatively connected to said worm member, comprised of a series of co-operating discs slidable toward and away from said member; a brake clutch in said casing, operatively connected to said worm-member, comprised of a series of co-operating discs slidable toward and away from said member; a manually operable member protruding from the casing; means operatively connected to the last-named member, adapted to engage the drive clutch when moved toward the worm member and to engage the brake clutch when moved in the reverse direction.

6. In a device of the class described, in combination with an oil-tight casing and a worm-gear mechanism therein, a plurality of clutches in said casing, each partly comprised of a series of co-operating discs, and connected to alternately drive and stop the worm-gear mechanism; power driven means, also in the casing, driving one of said clutches; a manually operable member protruding from the casing; a clutch actuating member between said clutches to alternately actuate them and movable toward and away from said gear mechanism; means operatively connecting the manually operable member to the clutch actuating member to move the same toward the gear mechanism to set the drive clutch, and in the reverse direction to set the brake clutch, both said clutches operating on the worm member of the gear mechanism.

7. The combination of an oil tight casing, a drive shaft and shaft to be driven thereby, in said casing, the axis of the last-named shaft being at right angles to the first-named shaft and connected therewith through suitable gear mechanism; a plurality of friction clutch elements in said casing, adapted to co-operate to impart the movement of the first-named shaft to said gear mechanism; a plurality of friction clutch elements in said casing, capable of a brake action on said gear mechanism; a movable non-rotatable member between the pluralities of clutch elements, movably connected to the casing, adapted to cause their alternate actuation; a manually operable member protruding from the casing and operatively connected to set the drive clutch when the non-rotatable member is moved toward the gear mechanism and to set the brake clutch and release the drive clutch when moved in the opposite direction.

8. In a device of the class described in combination, an oil tight casing and a drive shaft therein; a shaft to be driven by said drive shaft, also in the casing, and journaled above the same; suitable gear mechanism connecting the shafts; a drive clutch adapted to impart the movement of the drive shaft to the driven shaft, comprising a series of friction discs; a brake clutch, also in the casing, adapted to retard the movement of the driven shaft when the drive clutch is released, and comprised of a series of friction discs; a manually operable member protruding from the casing and movable between two positions; a clutch actuating member between the drive clutch and the brake clutch and positioned jointly by the manually operable member and the casing, and adapted to alternately actuate said clutches by virtue of its connection with the last-named member; a second clutch actuating member, actuated by the first, to set the drive clutch when moved toward the gear mechanism, and the first-named clutch actuating member setting the brake clutch when moved away from said mechanism.

9. In a transmission device, the combination with a drive shaft, and shaft to be driven thereby, of a worm-drive mechanism operatively connected with said last-named shaft; a clutch member carried by said first-named shaft, provided with friction clutch elements; a clutch-member carried by said worm-drive mechanism, and provided with friction clutch elements adapted for engagement with said first-named clutch elements; a brake clutch mechanism spaced apart from said clutch devices; a movable member interposed between said first-named clutch devices and said brake clutch mechanism, capable of alternately actuating the same, and means for operating said movable member.

10. In a transmission mechanism, in combination with a drive shaft, and shaft to be driven thereby, a gear mechanism adapted to impart the movement of said drive shaft to the last-named shaft; a clutch mechanism adapted to impart the movement of the drive shaft to said gear mechanism, comprising a member rotatable with said shaft, a member connected with said gear mechanism, and a series of co-operating friction discs, carried partly by one of said members and partly by the other; an operating member, loosely mounted on said drive shaft and adapted to actuate said friction discs, to cause the engagement thereof; a brake-clutch mechanism in proximity to said first-named clutch mechanism, comprising a member having a ball-bearing relation with said operating member, and a plurality of friction discs interposed between said member and the gear mechanism clutch member, and engagable to interrupt the movement of said last-named clutch member; and means for engagement with said brake-clutch member, to cause a simultaneous movement of said member and said operating member, to coincidently release the brake clutch and set the drive clutch or the reverse, as desired.

In testimony whereof we affix our signatures.

FREDERICK D. WILSON.
LEONARD S. BURNS.